United States Patent
Lee et al.

(10) Patent No.: US 10,629,951 B2
(45) Date of Patent: Apr. 21, 2020

(54) ELECTROLYTE COMPOSITION AND A SODIUM ION BATTERY COMPRISING THE SAME

(71) Applicant: SOLVAY SA, Brussels (BE)

(72) Inventors: Ji-hun Lee, Seoul (KR); Hag-Soo Kim, Seoul (KR)

(73) Assignee: SOLVAY SA, Brussels (BE)

(*) Notice: Subject to any disclaimer, the term of this patent is extended or adjusted under 35 U.S.C. 154(b) by 582 days.

(21) Appl. No.: 14/781,617

(22) PCT Filed: Mar. 25, 2014

(86) PCT No.: PCT/EP2014/055942
§ 371 (c)(1),
(2) Date: Oct. 1, 2015

(87) PCT Pub. No.: WO2014/161746
PCT Pub. Date: Oct. 9, 2014

(65) Prior Publication Data
US 2016/0064774 A1   Mar. 3, 2016

(30) Foreign Application Priority Data

Apr. 5, 2013 (EP) .................................. 13162606

(51) Int. Cl.
*H01M 10/0567* (2010.01)
*H01M 10/054* (2010.01)
*H01M 10/0568* (2010.01)
*H01M 10/0569* (2010.01)

(52) U.S. Cl.
CPC ..... *H01M 10/0567* (2013.01); *H01M 10/054* (2013.01); *H01M 10/0568* (2013.01); *H01M 10/0569* (2013.01); *H01M 2300/0025* (2013.01); *H01M 2300/0034* (2013.01)

(58) Field of Classification Search
CPC ......... H01M 10/0567; H01M 10/0568; H01M 10/0569; H01M 10/054; H01M 2300/0025; H01M 2300/0034
See application file for complete search history.

(56) References Cited

U.S. PATENT DOCUMENTS

| | | | |
|---|---|---|---|
| 2010/0119956 A1 | 5/2010 | Tokuda et al. | |
| 2011/0052986 A1* | 3/2011 | Barker | H01M 4/5825 429/220 |
| 2011/0091768 A1 | 4/2011 | Ohashi et al. | |
| 2012/0264010 A1 | 10/2012 | Kato et al. | |
| 2013/0011728 A1 | 1/2013 | Tokuda et al. | |
| 2013/0216918 A1 | 8/2013 | Tokuda et al. | |
| 2013/0337343 A1 | 12/2013 | Tokuda et al. | |
| 2017/0062868 A1* | 3/2017 | Kageura | H01M 10/0567 |

FOREIGN PATENT DOCUMENTS

| | | |
|---|---|---|
| CN | 102623747 A | 8/2012 |
| EP | 2144321 A1 | 1/2010 |
| JP | 2004031079 A | 1/2004 |

* cited by examiner

*Primary Examiner* — Laura Weiner

(57) ABSTRACT

Disclosed is an electrolyte composition, suitable for sodium ion battery, comprising at least one sodium compound selected from the group consisting of sodium monofluorophosphate ($Na_2PO_3F$), sodium difluorophosphate ($NaPO_2F_2$) and mixture thereof, and a sodium ion battery comprising the same.

13 Claims, No Drawings

ELECTROLYTE COMPOSITION AND A SODIUM ION BATTERY COMPRISING THE SAME

This application is a U.S. national stage entry under 35 U.S.C. § 371 of International Application No. PCT/EP2014/055942 filed Mar. 25, 2014, which claims priority to European patent application No. 13162606.1 filed on 5 Apr., 2013. The entire contents of these applications are explicitly incorporated herein by this reference.

TECHNICAL FIELD

The present invention relates to an electrolyte composition suitable for sodium ion battery, and a sodium ion battery comprising the same.

BACKGROUND OF THE INVENTION

Although, presently, lithium ion batteries are widely used as secondary batteries, studies have been conducted on sodium-ion secondary batteries in which sodium ion is employed in place of lithium ion of the lithium ion batteries.

The sodium ion batteries usually comprise an anode, a cathode and an electrolyte composition containing one or more solvent, and one or more conductive salt and/or additive.

International patent application WO 2010/109889 A1 discloses a sodium ion secondary battery which is provided with a positive electrode, a negative electrode having a negative electrode active material, and a nonaqueous electrolyte solution containing a nonaqueous solvent, wherein a hard carbon is used as the negative electrode active material and the nonaqueous solvent is substantially composed of propylene carbonate, a mixed solvent of ethylene carbonate and diethyl carbonate, or a mixed solvent of ethylene carbonate and propylene carbonate.

International patent application WO 2012/132813 A1 further discloses an additive for sodium ion secondary batteries containing a compound that is composed of a saturated cyclic carbonate having a fluoro group and/or a chain carbonate having a fluoro group, and a sodium ion secondary battery comprising a nonaqueous electrolyte solution which contains the additive for sodium ion secondary batteries and a nonaqueous solvent that is composed of a saturated cyclic carbonate or a nonaqueous solvent that is composed of a saturated cyclic carbonate and a chain carbonate; a positive electrode; and a negative electrode which has a coating film on the surface, said coating film being composed of a composite material containing carbon, oxygen, fluorine and sodium, and which contains a negative electrode active material that is composed of hard carbon.

DESCRIPTION OF THE INVENTION

The purpose of the present invention is to provide an electrolyte composition comprising an advantageous component, especially advantageous component for sodium ion battery. Another objective is to provide the sodium salt derivatives suitable as a conducting salt and/or an additive for the electrolyte composition of sodium ion battery.

The present invention therefore relates to an electrolyte composition, comprising at least one sodium compound selected from the group consisting of sodium monofluorophosphate ($Na_2PO_3F$), sodium difluorophosphate ($NaPO_2F_2$) and mixture thereof, suitable for sodium ion battery.

Indeed, it has been found that the electrolyte composition containing certain sodium derivatives has excellent thermal characteristics, such as stability, especially at high temperature. Other advantages when the electrolyte composition according to the present invention is employed in the battery system are a superior initial discharge capacity as well as a nice stability of electrodes, especially of cathode. Still another advantage is an outstanding lifetime.

Further, the sodium compound selected from the group of sodium monofluorophosphate, sodium difluorophosphate and mixture thereof can advantageously form SEI (Solid Electrolyte Interface) in the sodium ion battery, for example on the surface of cathode and/or anode, mainly on the surface of cathode, preventing decomposition of the electrolyte composition and/or of the electrodes.

The electrolyte composition according to the present invention can be suitably used for sodium ion battery. In the sodium ion battery, cations in the electrolyte composition enabling electrons to keep flowing to conduct electricity in the battery system usually comprise sodium ions as main conducting-cations and may optionally comprise further small amount of other cations. Thus, in the electrolyte composition according to the present invention, cations in the electrolyte composition enabling to conduct electricity in the battery are preferably essentially consisted of sodium ions.

In the present invention, the concentration of the sodium compound in the electrolyte composition is preferably at least 0.1 wt %, more preferably at least 0.5 wt %, still more preferably at least 0.8 wt %, relative to the total weight of the electrolyte composition. In the present invention, the concentration of the sodium compound in the electrolyte composition is preferably up to 2.0 wt %, more preferably up to 1.5 wt %, still more preferably up to 1.2 wt %, relative to the total weight of the electrolyte composition.

In the present invention, the electrolyte composition for sodium ion battery may include a conducting salt in addition to the sodium compound. The conducting salt is preferably at least one sodium salt selected from the group consisting of $NaPF_6$, $NaBF_4$, $NaClO_4$, $NaAsF_6$, $NaTaF_6$, $NaAlCl_4$, $Na_2B_{10}Cl_{10}$, $NaCF_3SO_3$, $Na(CF_3SO_2)_2N$, $Na(C_2F_5SO_2)_2N$, $NaB(C_6H_5)_4$, $NaCH_3SO_3$, $Na(SO_2CF_3)_3C$, and any combination thereof, more preferably $NaPF_6$, $NaBF_4$, $NaAsF_6$, $NaTaF_6$, $NaCF_3SO_3$, $Na(CF_3SO_2)_2N$, $Na(C_2F_5SO_2)_2N$, $Na(SO_2CF_3)_3C$, and any combination thereof, still more preferably $NaPF_6$ or $Na(CF_3SO_2)_2N$. Further preferred example of the conducting salt in the present invention is sodium bis(fluorosulfonyl)imide ($Na(FSO_2)_2N$). The concentration of the conducting salt in the electrolyte composition is preferably 0.1 wt % to 3.0 wt %, more preferably 0.5 wt % to 1.5 wt %, still more preferably 0.8 wt % to 1.2 wt %, relative to the total weight of the electrolyte composition, but the present invention is not limited thereto.

The electrolyte composition according to the present invention preferably comprises the sodium compound selected from the group of sodium monofluorophosphate, sodium difluorophosphate and mixture thereof, in combination with $NaPF_6$ or $Na(CF_3SO_2)_2N$. The electrolyte composition according to the present invention may comprise the sodium compound selected from the group of sodium monofluorophosphate, sodium difluorophosphate and mixture thereof, in combination with $NaPF_6$, $Na(CF_3SO_2)_2N$, and/or $Na(FSO_2)_2N$.

The electrolyte composition according to the present invention may further comprise at least one suitable additive. In one embodiment of the present invention, the electrolyte composition for sodium ion battery further comprises a halogenated organic compound as the additive. The halogenated organic compounds useful as additives are, for example, fluorinated carbonic esters which are selected from the group of fluorinated ethylene carbonates, polyfluorinated dimethyl carbonates, fluorinated ethyl methyl carbonates, and fluorinated diethyl carbonates are other solvents or, preferably, suitable additives in the electrolyte composition. Preferred fluorinated carbonates are monofluoroethylene carbonate, 4,4-difluoro ethylene carbonate, 4,5-difluoro ethylene carbonate, 4-fluoro-4-methyl ethylene carbonate, 4,5-difluoro-4-methyl ethylene carbonate, 4-fluoro-5-methyl ethylene carbonate, 4,4-difluoro-5-methyl ethylene carbonate, 4-(fluoromethyl)-ethylene carbonate, 4-(difluoromethyl)-ethylene carbonate, 4-(trifluoromethyl)-ethylene carbonate, 4-(fluoromethyl)-4-fluoro ethylene carbonate, 4-(fluoromethyl)-5-fluoro ethylene carbonate, 4-fluoro-4,5-dimethyl ethylene carbonate, 4,5-difluoro-4,5-dimethyl ethylene carbonate, and 4,4-difluoro-5,5-dimethyl ethylene carbonate; dimethyl carbonate derivatives including fluoromethyl methyl carbonate, difluoromethyl methyl carbonate, trifluoromethyl methyl carbonate, bis(difluoro)methyl carbonate, and bis(trifluoro)methyl carbonate; ethyl methyl carbonate derivatives including 2-fluoroethyl methyl carbonate, ethyl fluoromethyl carbonate, 2,2-difluoroethyl methyl carbonate, 2-fluoroethyl fluoromethyl carbonate, ethyl difluoromethyl carbonate, 2,2,2-trifluoroethyl methyl carbonate, 2,2-difluoroethyl fluoromethyl carbonate, 2-fluoroethyl difluoromethyl carbonate, and ethyl trifluoromethyl carbonate; and diethyl carbonate derivatives including ethyl (2-fluoroethyl) carbonate, ethyl (2,2-difluoroethyl) carbonate, bis(2-fluoroethyl) carbonate, ethyl (2,2,2-trifluoroethyl) carbonate, 2,2-difluoroethyl 2'-fluoroethyl carbonate, bis(2,2-difluoroethyl) carbonate, 2,2,2-trifluoroethyl 2'-fluoroethyl carbonate, 2,2,2-trifluoroethyl 2',2'-difluoroethyl carbonate, and bis(2,2,2-trifluoroethyl) carbonate, 4-fluoro-4-vinylethylene carbonate, 4-fluoro-5-vinylethylene carbonate, 4,4-difluoro-4-vinylethylene carbonate, 4,5-difluoro-4-vinylethylene carbonate, 4-fluoro-4,5-divinylethylene carbonate, 4,5-difluoro-4,5-divinylethylene carbonate, 4-fluoro-4-phenylethylene carbonate, 4-fluoro-5-phenylethylene carbonate, 4,4-difluoro-5-phenylethylene carbonate, 4,5-difluoro-4-phenylethylene carbonate and 4,5-difluoro-4,5-diphenylethylene carbonate, fluoromethyl phenyl carbonate, 2-fluoroethyl phenyl carbonate, 2,2-difluoroethyl phenyl carbonate and 2,2,2-trifluoroethyl phenyl carbonate, fluoromethyl vinyl carbonate, 2-fluoroethyl vinyl carbonate, 2,2-difluoroethyl vinyl carbonate and 2,2,2-trifluoroethyl vinyl carbonate, fluoromethyl allyl carbonate, 2-fluoroethyl allyl carbonate, 2,2-difluoroethyl allyl carbonate and 2,2,2-trifluoroethyl allyl carbonate. The halogenated organic compound useful as an additive is more preferably fluorinated cyclic carbonates, still more preferably a monofluoroethylene carbonate. However, the additives which can be used in the present invention are not limited thereto.

The content of an additive in the electrolyte composition, if any, is preferably 0.1 to 10.0 wt %, more preferably 0.5 to 5.0 wt %, still more preferably 0.5 to 2.0 wt %, relative to the total weight of the electrolyte composition.

Preferably, the electrolyte composition according to the present invention comprises the sodium compound selected from the group of sodium monofluorophosphate, sodium difluorophosphate and mixture thereof, and monofluoroethylene carbonate. In a certain embodiment, the above electrolyte composition comprises $NaPF_6$ or $Na(CF_3SO_2)_2N$ in addition to the combination of the sodium compound and monofluoroethylene carbonate. Further, the electrolyte composition according to the present invention may comprise $NaPF_6$, $Na(CF_3SO_2)_2N$, and/or $Na(FSO_2)_2N$ in addition to the combination of the sodium compound and monofluoroethylene carbonate.

In the context of the present invention, the term "comprise" or "comprising" is intended to mean also "consist of" or "consisting of." The plural is intended to include the singular, and vice versa.

In the present invention, the electrolyte composition generally comprises at least one solvent. The solvent of the electrolyte composition for sodium ion battery preferably includes at least one non-aqueous solvent selected from the group consisting of cyclic carbonates, acyclic carbonates and any combination thereof. Examples of cyclic carbonates include cyclic alkylene carbonates, such as ethylene carbonate, propylene carbonate, vinylidene carbonate and butylene carbonate. Examples of acyclic carbonates include acyclic dialkyl carbonates, such as dimethyl carbonate, methylethyl carbonate and diethyl carbonate. More preferably, the solvent includes at least one organic carbonate selected from the group consisting of acyclic dialkyl carbonates, cyclic alkylene carbonates, and combination thereof, still more preferably from the group consisting of ethylene carbonate, propylene carbonate, and diethyl carbonate. Other suitable solvents can be selected, for example, from lactones, formamides, pyrrolidinones, oxazolidinones, nitroalkanes, N,N-substituted urethanes, sulfolane, dialkyl sulfoxides, dialkyl sulfites, acetates, nitriles, acetamides, glycol ethers, dioxolanes, dialkyloxyethanes, and trifluoroacetamides. Particular examples of the solvents include dimethyl formamide, carboxylic acid amides, for example, N,N-dimethyl acetamide and N,N-diethyl acetamide, acetone, acetonitrile, and any combination thereof.

The at least one solvent may occupy the rest of content of the electrolyte composition in addition to the components described in the above, particularly in addition to the sodium compound, the conducting salt and the additive. The content of the at least one solvent is preferably 85 to 99 wt %, more preferably 92 to 98.5 wt %, still more preferably 95.5 to 98 wt %, relative to the total weight of the electrolyte composition.

The electrolyte composition according to the present invention may be a polymer gel type electrolyte. In this instance, the electrolyte composition according to the present invention can comprise at least one polymer to form the polymer gel electrolyte. Such a polymer may be an ion-conductive polymer, a polymer which is not ion-conductive, or combination thereof. Examples of the ion-conductive polymer include polyfluorovinylidene (PVDF), polyvinyl chloride (PVC), polyacrylonitrile (PAN), polymethyl methacrylate (PMMA), and any combination thereof. Examples of the polymer which is not ion-conductive include polyethyleneoxide (PEO), polypropyleneoxide (PPO), and combination thereof. However, the polymer which can be used in the present invention is not limited thereto.

When the electrolyte composition includes at least one conducting salt containing halogen atoms, in particular fluorine atoms, the conducting salt may be decomposed to form hydrogen halides, such as hydrofluoric acid (HF), in the electrolyte composition, especially during its use at a high temperature. The formation of HF may cause problematic issues, such as a decrease in lifetime by dissolving of metal components contained in the electrode of sodium ion battery. The use of sodium monofluorophosphate and/or sodium difluorophosphate has an advantage to lead to a good stability of the electrolyte composition. This advantage can eventually contribute to an increased lifetime.

The electrolyte compound according to the present invention can be suitably used in sodium ion batteries. Thus, another aspect of the present invention concerns a sodium ion battery which comprises a cathode, an anode and the electrolyte composition of the present invention.

Sodium ion batteries are a type of reusable battery that uses sodium ions as a way to store power in a system, and are believed to have advantages, such as cost competitiveness as sodium is more abundant than lithium and durability, over lithium ion batteries which are the most frequently used rechargeable batteries these days.

The anode of sodium ion batteries usually comprises a current collector, an anode active material, and a binder.

The preferred anode active material in the present invention is a non-graphite carbon, such as a soft carbon and a hard carbon, and more preferred anode active material in the present invention is a hard carbon, but any other known anode active materials for sodium ion batteries can be used. Examples of anode active material include carbon materials, such as a non-graphite carbon, a graphite, a carbon black, a carbon nano tube, elements which can be alloyed with sodium, such as Si, Ge, Sn, Pb, In, Zn, Ca, Sr, Ba, Ru, Rh, Ir, Pd, Pt, Ag, Au, Cd, Hg, Ga, Tl, C, N, Sb, Bi, O, S, Se, Te, and Cl, oxides comprising said element, such as SiO, SiOx ($0<x<2$), SnO$_2$, SnOx ($0<x<2$) and SnSiO$_3$, or carbides, such as SiC, metals, such as sodium metal, or sodium-transition metal mixed oxide, such as sodium-titanium mixed oxide (Na$_4$Ti$_5$O$_{12}$), but the present invention is not limited thereto.

The examples of the binder for anode include thermoplastic resins, such as polyfluorovinylidene (PVDF), polytetrafluoroethylene (PTFE), polyvinylacetate, polyimide (PI), polyamide (PA), polyvinyl chloride (PVC), polymethyl acrylate (PMA), polymethyl methacrylate (PMMA), polyether nitrile (PEN), polyethylene (PE), polypropylene (PP), polyacrylonitrile (PAN), thermosetting resins, such as epoxy resin, polyurethane resin, urea resin, rubbers, such as styrene-butadiene rubber (SBR), polysaccharides, such as starch, methyl cellulose, carboxymethyl cellulose, hydroxymethyl cellulose, hydroxyethyl cellulose, hydroxypropyl cellulose, carboxymethylhydroxyethyl cellulose, nitro cellulose, or their derivatives, and any combination thereof, but the present invention is not limited thereto.

The cathode of sodium ion batteries usually comprises at least a current collector, a cathode active material and an optional binder. As to the optional binder, the above-described binder for the anode can be similarly used.

The cathode active material in the present invention includes at least one material which can intercalate and de-intercalate sodium, particularly includes sodium-containing compound. Particular class of the cathode active material is sodium-metal mixed oxides. Examples of the cathode active material in the present invention include NaFeO$_2$, NaCoO$_2$, NaCrO$_2$, NaMnO$_2$, NaNiO$_2$, NaNi$_{1/2}$Ti$_{1/2}$O$_2$, NaNi$_{1/2}$Mn$_{1/2}$O$_2$, Na$_{2/3}$Fe$_{1/3}$Mn$_{2/3}$O$_2$, NaNi$_{1/3}$CO$_{1/3}$Mn$_{1/3}$O$_2$, NaMn$_2$O$_4$, NaNi$_{1/2}$Mn$_{3/2}$O$_2$, NaFePO$_4$, NaMnPO$_4$, NaCoPO$_4$, Na$_2$FePO$_4$F, Na$_2$MnPO$_4$F, Na$_2$CoPO$_4$F, and any combination thereof, but the present invention is not limited thereto.

Since the cathode active material usually comprises expensive transition metal, there is a continuous demand for an inexpensive cathode active material while keeping its performances, such as capacity, as the cathode active material intact. For example, it is believed that replacement of Co preferably with Ni, more preferably with Fe or Mn in the cathode active material would result in a decrease in cost for the cathode preparation. However, when Mn is included in the cathode active material, Mn may be dissolved from the electrode and eventually causes a deterioration of the cathode electrode.

In the present invention, it has been found that the electrolyte composition comprising the sodium compound increases a stability of electrodes of the sodium ion battery. It has also been found that the sodium ion battery according to the present invention can attain an excellent lifetime. The presence of the sodium compound in the electrolyte compositions according to the present invention, allows to prevent or at least slow down the dissolution of the metals contained in the active materials in the electrode, especially the dissolution of manganese.

Accordingly, in a particular embodiment, the sodium ion battery according to the present invention comprises, in addition to the electrolyte composition according to the present invention, the cathode comprising the a cathode active material containing at least one metals other than sodium metal, notably manganese.

While preferred embodiments of this invention have been shown and described, modifications thereof can be made by one skilled in the art without departing from the spirit or teaching of this invention. The embodiments described herein are exemplary only and are not limiting. Many variations and modifications of systems and methods are possible and are within the scope of the invention. Accordingly, the scope of protection is not limited to the embodiments described herein, but is only limited by the claims that follow, the scope of which shall include all equivalents of the subject matter of the claims.

Should the disclosure of any patents, patent applications, and publications which are incorporated herein by reference conflict with the description of the present application to the extent that it may render a term unclear, the present description shall take precedence.

The following examples are intended to describe the invention in further detail without the intention to limit it.

EXAMPLES

Example 1

An anode comprising the anode active material composition prepared by mixing a hard carbon, PVDF binder, and N-methyl-2-pyrrolidone (NMP), and a cathode comprising the cathode active material composition prepared by mixing NaNi$_{1/2}$Mn$_{1/2}$O$_2$, PVDF binder, acetylene black, and N-methyl-2-pyrrolidone are prepared. An electrolyte composition of 1.0 M NaPF$_6$/propylene carbonate (PC)+diethyl carbonate (DEC) comprising the sodium compound according to the present invention (sodium difluorophosphate (NaPO$_2$F$_2$)) is used. The battery cells comprising the anode, the cathode and the electrolyte composition are charged and discharged several times. The results show that the battery comprising the electrolyte composition according to the present invention has a superior lifetime.

The invention claimed is:

1. A sodium ion battery which comprises a cathode, an anode and an electrolyte composition comprising at least one sodium compound selected from the group consisting of sodium monofluorophosphate (Na$_2$PO$_3$F), sodium difluorophosphate (NaPO$_2$F$_2$) and mixture thereof, wherein the cations in the electrolyte composition enabling conduction of electricity consist essentially of sodium ions, and wherein the cathode comprises a cathode active material comprising NaFeO$_2$, NaCoO$_2$, NaCrO$_2$, NaMnO$_2$, NaNiO$_2$, NaNi$_{1/2}$Ti$_{1/2}$ O$_2$, NaNi$_{1/2}$Mn$_{1/2}$O$_2$, Na$_{2/3}$Fe$_{1/3}$Mn$_{2/3}$O$_2$, NaNi$_{1/3}$ $Co_{1/3}Mn_{1/3}O_2$, $NaMn_2O_4$, $NaNi_{1/2}Mn_{3/2}O_2$, $NaFePO_4$, $NaMnPO_4$, $NaCoPO_4$, $Na_2FePO_4F$, $Na_2MnPO_4F$, $Na_2CoPO_4F$, or any combination thereof; wherein the concentration of the sodium compound is 0.2 to 2.0 wt %, relative to the total weight of the electrolyte composition, and wherein the electrolyte composition further comprises, in addition to the sodium compound, a sodium salt.

2. The sodium ion battery according to claim 1, wherein the cathode active material comprises manganese.

3. The sodium ion battery according to claim 1, wherein the electrolyte composition comprises a non-aqueous solvent selected from the group consisting of cyclic carbonates, acyclic carbonates and any combination thereof.

4. The sodium ion battery according to claim 3, wherein the non-aqueous solvent comprises acyclic dialkyl carbonates, cyclic alkylene carbonates, or a combination thereof.

5. The sodium ion battery according to claim 4, wherein the non-aqueous solvent comprises ethylene carbonate, propylene carbonate, or diethyl carbonate.

6. The sodium ion battery according to claim 1, wherein the concentration of the sodium compound is 0.5 to 1.5 wt %, relative to the total weight of the electrolyte composition.

7. The sodium ion battery according to claim 6, wherein the concentration of the sodium compound is 0.8 to 1.2 wt %, relative to the total weight of the electrolyte composition.

8. The sodium ion battery according to claim 1, wherein the sodium salt is selected from the group consisting of $NaPF_6$, $NaBF_4$, $NaClO_4$, $NaAsF_6$, $NaTaF_6$, $NaAlCl_4$, $Na_2B_{10}Cl_{10}$, $NaCF_3SO_3$, $Na(CF_3SO_2)_2N$, $Na(C_2F_5SO_2)_2N$, $NaB(C_6H_5)_4$, $NaCH_3SO_3$, $Na(SO_2CF_3)_3C$, $Na(FSO_2)_2N$, and any combination thereof.

9. The sodium ion battery according to claim 8, wherein the sodium salt is selected from the group consisting of $NaPF_6$, $NaBF_4$, $NaAsF_6$, $NaTaF_6$, $NaCF_3SO_3$, $Na(CF_3SO_2)_2N$, $Na(C_2F_5SO_2)_2N$, $Na(SO_2CF_3)_3C$, and any combination thereof.

10. The sodium ion battery according to claim 9, wherein the sodium salt is $NaPF_6$ or $Na(CF_3SO_2)_2N$.

11. The sodium ion battery according to claim 1, further comprising a halogenated organic compound, wherein the halogenated organic compound is a fluorinated carbonate.

12. The sodium ion battery according to claim 11, wherein the fluorinated carbonate is a fluorinated cyclic carbonate.

13. The sodium ion battery according to claim 12, wherein the fluorinated cyclic carbonate is a monofluoroethylene carbonate.

* * * * *